June 21, 1966 R. HEID 3,256,967
SHEET METAL CLUTCH DISC AND HUB
Filed March 30, 1964 6 Sheets-Sheet 2
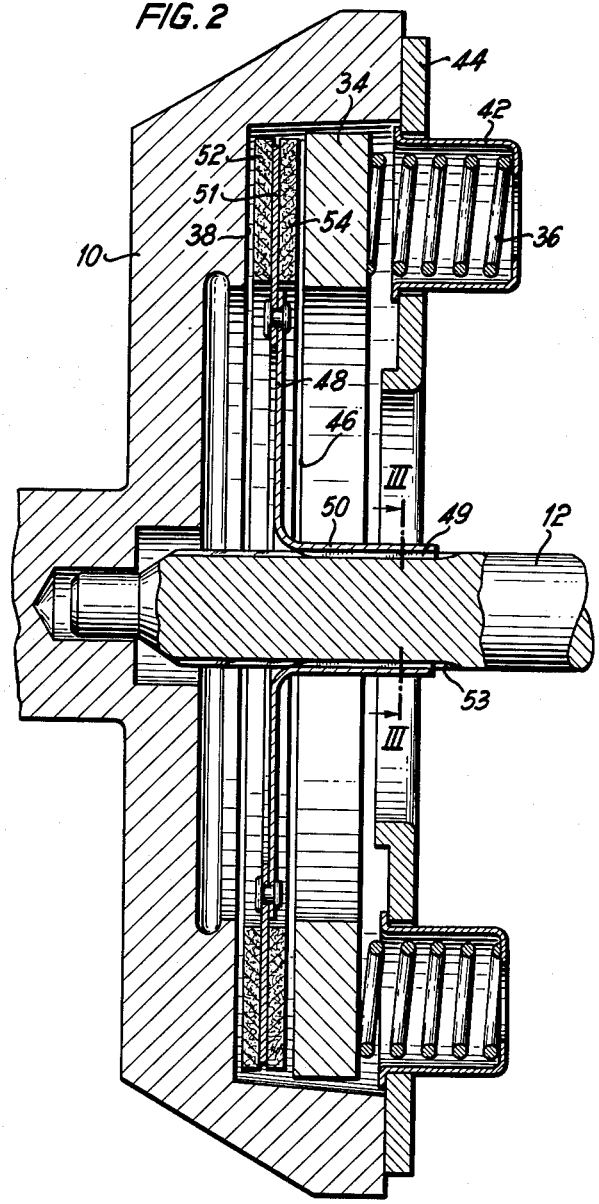
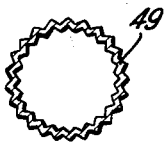
INVENTOR
Roland Heid
By Richard Low
Ag't June 21, 1966 R. HEID 3,256,967
SHEET METAL CLUTCH DISC AND HUB
Filed March 30, 1964 6 Sheets-Sheet 3

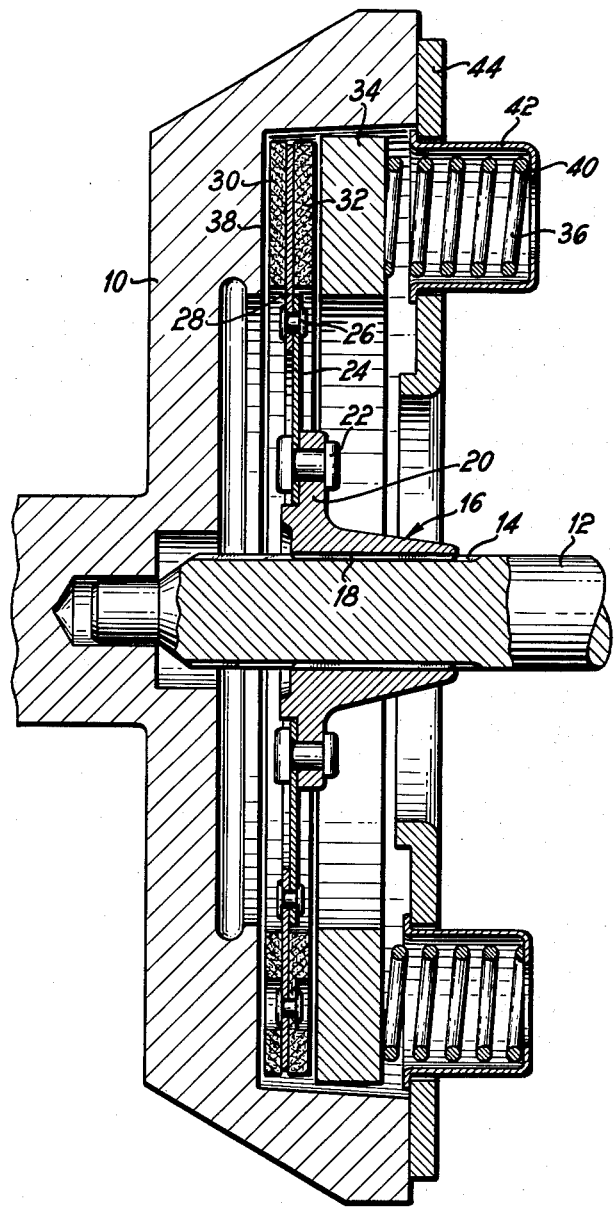

INVENTOR
Roland Heid
By Richard [?]
Ag't

June 21, 1966  R. HEID  3,256,967
SHEET METAL CLUTCH DISC AND HUB
Filed March 30, 1964  6 Sheets-Sheet 4

INVENTOR
Roland Heid
By Richard Low
Ag't

June 21, 1966  R. HEID  3,256,967
SHEET METAL CLUTCH DISC AND HUB
Filed March 30, 1964  6 Sheets-Sheet 5

INVENTOR
Roland Heid
By Richard Low
Agt

June 21, 1966     R. HEID     3,256,967

SHEET METAL CLUTCH DISC AND HUB

Filed March 30, 1964     6 Sheets-Sheet 6

INVENTOR
Roland Heid ns
3,256,967
SHEET METAL CLUTCH DISC AND HUB
Roland Heid, Schweinfurt am Main, Germany, assignor to Fichtel & Sachs A.G., Schweinfurt am Main, Germany, a corporation of Germany
Filed Mar. 30, 1964, Ser. No. 355,693
Claims priority, application Germany, Apr. 4, 1963, F 39,407
1 Claim. (Cl. 192—107)

This invention relates to clutches for automotive vehicles, and more particularly to a driven friction disc for such clutches.

Conventional clutch discs have a hub which is provided with internal grooves, and is axially slidable on the transmission main drive pinion while being secured against rotation on the pinion by splines on the latter. The hub carries a radial flange on which friction facings are mounted for axial engagement with the driving clutch members, usually the flywheel of the driving engine and a pressure plate.

The hubs of conventional clutch discs are forgings in which the spline-receiving grooves are formed by a secondary machining operation. This clutch disc is relatively costly. An object of this invention is the provision of a clutch disc which can be made in a more economical manner.

The radial dimensions of a forged hub must be relatively small if the hub is to be produced at reasonable cost. The connection between the conventional hub and the friction facings therefore requires a multiplicity of fastenings, such as rivets, each of which may fail. Another object of the invention is the provision of a clutch disc having an integral flange portion which extends radially outward from the axis over a distance sufficient to reduce the number of necessary fastenings for the friction facings.

Machined spline receiving grooves in a conventional hub cannot be made very smooth unless the cost of the hub is greatly increased by special finishing operations. An additional object of the invention is the economical provision of very smooth axially elongated grooves in the hub of a clutch disc in which the splines of the transmission main drive pinion may slide freely even while transmitting torque from the engine to the transmission.

Yet another object is the provision of a clutch disc whose mass is substantially smaller than that of a conventional disc with forged hub having comparable load capacity. It is frequently desired to equip an automotive transmission with a synchronization mechanism which accelerates the main drive pinion during speed changes. The driven clutch disc is attached to the pinion and rotates with it. The torque to be supplied by the synchronization mechanism thus may be smaller when the mass of the clutch disc is low.

Other objects and many of the attendant advantages of this invention will be readily appreciated as the same becomes better understood by reference to the following detailed description when considered in connection with the accompanying drawings in which:

FIG. 1 shows a conventional automotive clutch assembly of the dry type in axial section;

FIG. 2 shows a clutch assembly of the same type, but equipped with a clutch disc of the invention in a view corresponding to that of FIG. 1;

FIG. 3 shows the clutch disc of the apparatus of FIG. 2 in section on the line III—III.

Figure 4:
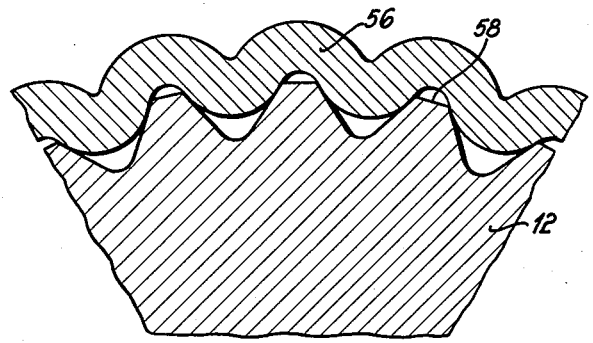
FIG. 4 shows a portion of the clutch disc of FIG. 3 on a greatly enlarged scale together with a cooperating portion of the driven shaft of the clutch assembly.

Referring now to the drawing in detail, and initially to FIG. 1, there is seen a flywheel 10 of an internal combustion engine, not otherwise shown. The flywheel is the driving member of the illustrated clutch assembly. The driven member is a shaft 12, which may be the main drive pinion of a multiple speed transmission, not further illustrated. One end of the shaft 12 is coaxially journaled in the flywheel 10. Splines 14 on the shaft 12 engage corresponding axially elongated grooves 18 in the hub 16 of a clutch disc assembly.

An integral flange 20 of the hub 16 carries a flat inner ring 24 which is attached to the flange 20 by rivets 22. An additional set of rivets 26 attaches a flat outer ring 28 to the inner ring 24. Annular friction facings 30, 32 are secured on the two flat faces of the outer ring 28.

The friction facing 32 normally engages the flat annular face of a pressure plate 34, whereas the facing 30 engages an annular contact face 38 on the flywheel 10. The pressure plate 34 is mounted on the flywheel in a manner not further shown to permit axial movement of the plate 34, but to prevent its rotation relative to the flywheel 10. The pressure plate is permanently being urged toward the clutch disc and the contact face 38 of the flywheel by a multiplicity of circumferentially distributed helical compression springs 36 of which only two are visible in FIG. 1. Each spring abuts against the pressure plate 34 and the bottom 40 of a respective cup shaped receptacle 42 mounted on a clutch cover 44. The cover is attached to the rim of the flywheel 10. A clutch release mechanism capable of axially moving the pressure plate 34 against the urging of the springs 36 has been omitted from the showing of FIG. 1.

The clutch illustrated in FIG. 2 is identical with the conventional device illustrated in FIG. 1 except for the clutch disc. The driving and driven clutch members again are a flywheel 10 and a shaft 12 respectively, and the clutch is normally held in the engaged condition by springs 36 mounted in receptacles 42 for actuating axial movement of a pressure plate 34.

The hub 46 of the illustrated clutch disc has a tubular sleeve portion 50 integral with a radial flange portion 48. A flat sheet metal ring 51 carrying friction facings 52, 54 is directly attached to the flange portion 48 whose diameter is about five times that of the sleeve portion 50. The portions 48, 50 consist of sheet metal having approximately uniform thickness. The sleeve portion 50, also shown in radial section in FIG. 3, has axially elongated serrations 49 so that axial grooves and ribs alternate in a circumferential direction, and grooves on the outer face of the sleeve portion are aligned along the same radius with ribs on the inner face, and vice versa. The serrations 49 of the sleeve portion 50 engage splines 53 on the shaft 12 to prevent rotation of the clutch disc on the shaft 12 while permitting axial movement.

Figure 5:
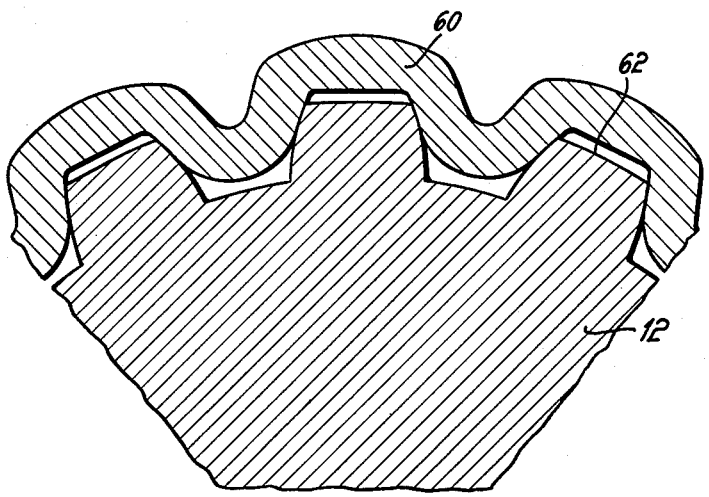
FIG. 5 illustrates a modification of the device of FIG. 4.

FIGS. 4 and 5 illustrate in detail the cooperation of splines on the shaft 12 with serrations on the sleeve portion of clutch discs of the invention. In the enlarged detail view of FIG. 4, the shaft 12 carries full fillet spline teeth 58. The sleeve portion 56 is corrugated for approximately conforming engagement with the teeth 58 so that grooves and ribs of arcuate cross section alternate on the two faces of the sleeve portion.

In the modified embodiment shown in FIG. 5, the shaft 12 carries involute spline teeth 62. The conforming sleeve portion 60 therefore has relatively wide ribs and narrow grooves on its outer face, and relatively narrow ribs and wide grooves on its inner face. Other suitable spline shapes, and the conforming sleeve shapes will readily suggest themselves to those skilled in the art.

In making the clutch disc of our invention, we draw a circular starting blank 64 of sheet metal in several successive steps. A male die 68 and a female die 66 shown in FIG. 7 above and below the blank 64 are moved toward each other in a conventional manner to produce a sheet metal member 70 of an intermediate shape seen in FIG. 7. When this intermediate shape is subjected to a second draw between dies 72, 74 illustrated in FIG. 7, there is obtained a flat cup of the shape shown in FIG. 7a. Successive additional draws between dies whose configuration is evident from the product obtained lead sequentially to narrower cups having flat flanged rims whose width increases as the diameter of the cup decreases. The drawn shapes are illustrated in sequence in FIGS. 7a to 7e. The ultimate drawn product has the flange portion 48, and a sleeve portion 50 one end of which is closed by the cup bottom 47. The bottom is removed by shearing.

Figure 8:
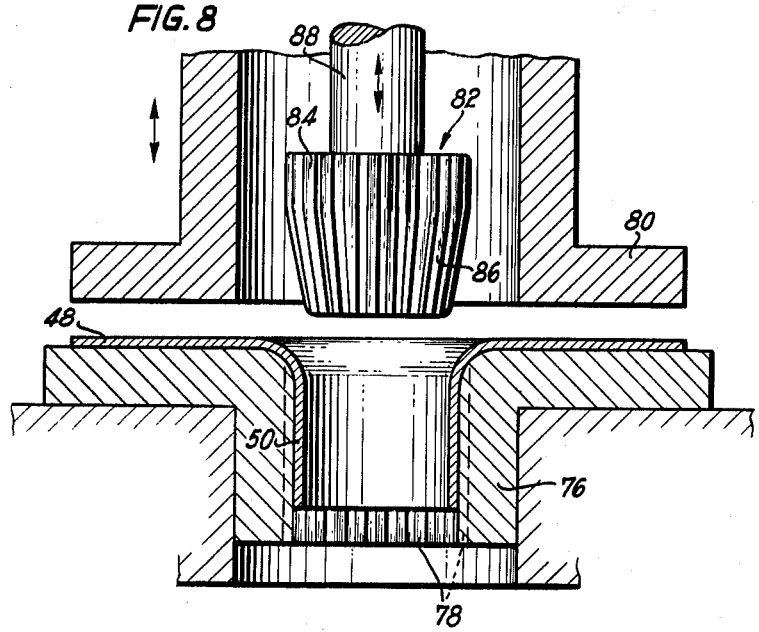
FIG. 8 shows a set of tools employed in forming spline engaging grooves in the hub of a clutch disc of the invention, the view being in section on the axis of the hub.

Serrations are next formed in the sleeve portion, and one arrangement for forming the serrations is illustrated in FIG. 8. A flanged tubular die 76 having a vertical axis is fixedly mounted on a stationary support. Its internal cylindrical wall carries axial ribs 78 of the shape desired to be imparted to the inner face of the sleeve portion 50. The sleeve portion is a cylindrical tube at this stage and loosely abuts against the ribs 78 whereas the flange portion 48 lies flat on the flange of the die 76.

An annular blankholder 80 is coaxially mounted above the die 76 on the piston of a hydraulic motor (not shown) which moves the blank holder 80 up and down as indicated by a double arrow, and clamps the flange portion 48 to the die 76 during the forming of serrations on the sleeve portion 50.

A serrating punch 82 is mounted on a hydraulically operated ram 88 for coaxial upward and downward movement. The free end 86 of the punch 82 conically tapers toward the die 76. Axially elongated ribs 84 are circumferentially distributed on the punch 82 in such a manner that the ribs 84 are radially aligned with the grooves between the ribs 78 of the die 76 when the punch 82 is lowered from the illustrated position.

During such lowering, the conical front end 86 of the punch and the obliquely inclined ribs 84 thereon engage the inner face of the sleeve portion 50, and displace correspondingly axially elongated circumferentially spaced portions of the sleeve portion radially outward into the grooves between the ribs 78. The ribs prevent those portions of the sheet material which are circumferentially interposed between the displaced portions from moving. No material is removed from the sleeve portion 50, and there need not be any significant increase in axial length.

Figure 9:
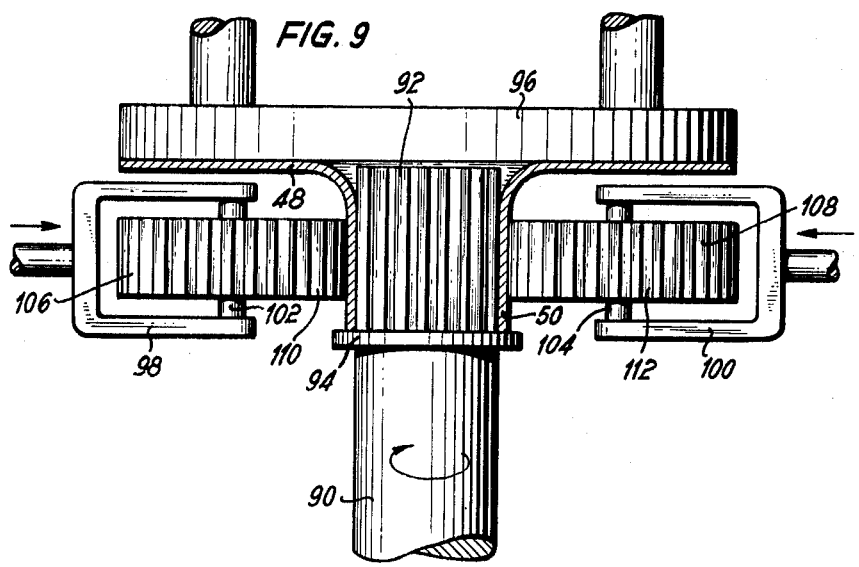
FIG. 9 shows another tool set for forming the hub grooves in an axially sectional view.

The apparatus illustrated in FIG. 9 is suited for another method of serrating the sleeve portion 50. A driven shaping roll 90 is dimensioned to fit into the sleeve portion 50 in such a manner that elongated ribs 78 on an axial end portion 92 of the roll touch the originally cylindrical inner face of the sleeve portion. The roll 90 whose axis of rotation is vertical has an integral collar 94 which fixes the axial position of the sleeve portion 50 on the roll 90 in one direction. Movement of the sleeve portion in the other axial direction is controlled by an abutment plate 96 which may be raised and lowered in a manner not shown. The flange portion 48 abuts against the plate 96.

The sleeve portion 50 is serrated between the shaping roll 90 and two pressure rolls 106, 108 which are freely rotatable on respective shafts 102, 104 in forks 98, 100. The forks are attached to respective hydraulic motors which drive the pressure rolls toward the shaping roll 90 from diametrically opposite directions as indicated by straight arrows. Axial ribs 110, 112 on the generally cylindrical faces of the pressure rolls are spaced for meshing interengagement with the ribs 78 on the shaping roll 90 while the sheet material of the sleeve portion 50 is restrained between the ribbed roll faces. The pressure rolls 106, 108 displace axially elongated portions of the sleeve material radially inward between the ribs 78 on the shaping roll 90.

The length of the serrations to be formed on the sleeve portion 50 is controlled in the apparatus of FIG. 8 by the axial movement of the punch 82. A similar control of the desired length of the serrations is available in the apparatus of FIG. 9 by selection of the width of the pressure rolls 106, 108.

The following example is further illustrative of the invention, but it will be understood that the invention is not limited to this example.

*Example*

Figure 6:
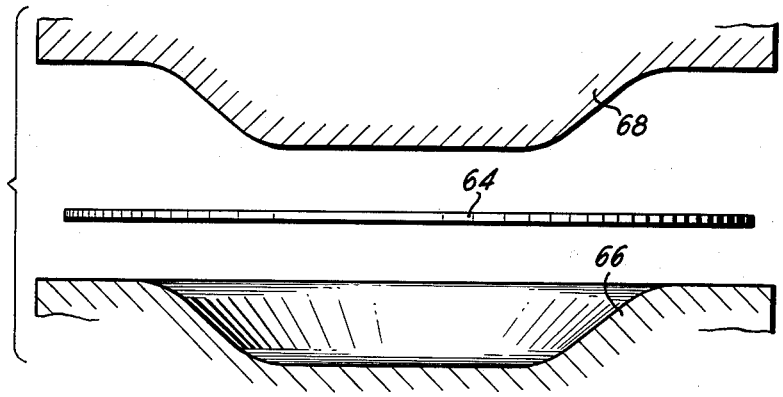
FIG. 6 shows a first drawing step in the making of the clutch disc of the invention from a flat blank, the view being in elevation and corresponding to an axial section of the finished clutch disc.
Figure 7:
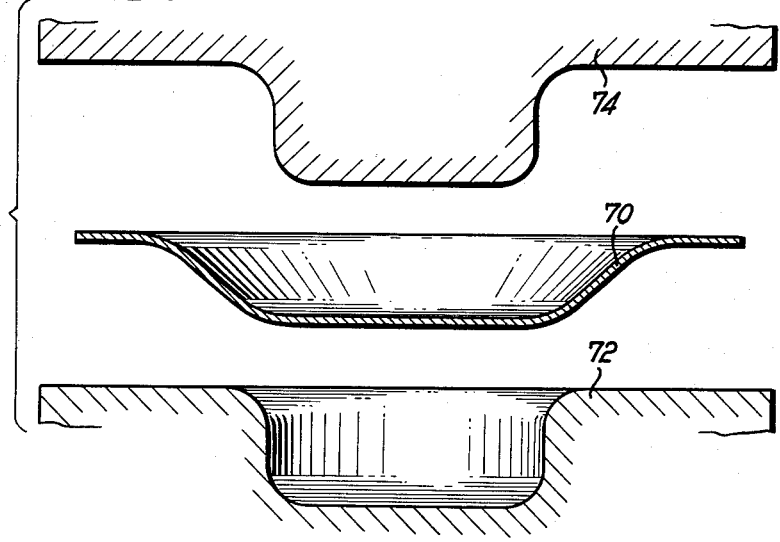
FIG. 7 shows a second drawing step in the manner of FIG. 6.
Figure 7A:
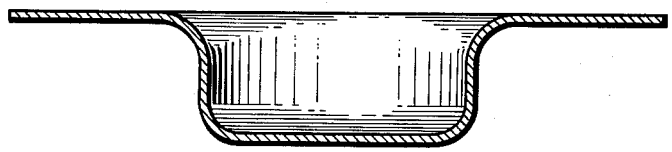
FIG. 7a to 7e illustrate successive shapes of the intermediate products formed in the drawing of the clutch disc.
Figure 7B:
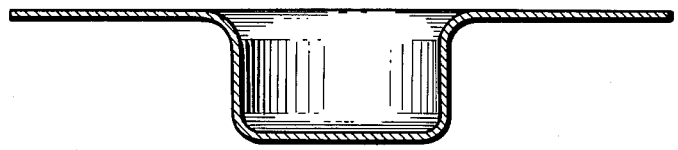
Figure 7C:
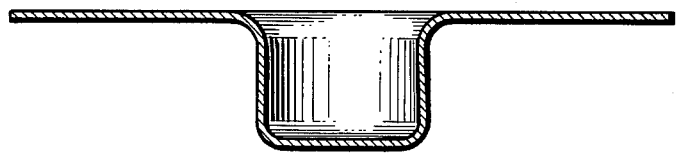
Figure 7D:
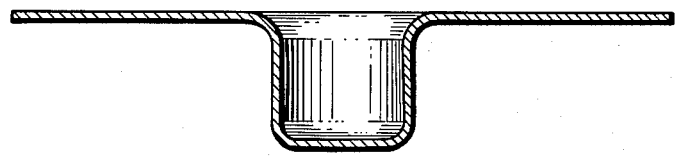
Figure 7E:
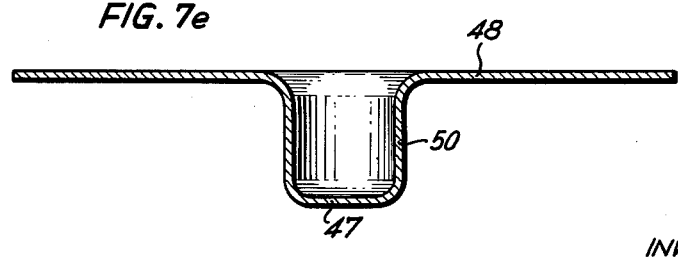

A circular sheet of steel meeting the requirements of German standard DIN–NORM C–10, and having an initial diameter of 134 millimeters was shaped at ambient temperatures (about 20° C.) between drawing dies of the types illustrated in FIGS. 6 and 7 until the cup shape illustrated in FIG. 7e was obtained. The bottom 47 was sheared off.

When drawing was completed, the flat annular flange portion 48 had an external diameter of about 125 millimeters. Its outer rim had a thickness of 1.5 millimeters, and the thickness decreased gradually toward the center to 1.25 millimeters. The radius of curvature at the arcuate transition from the flange portion to the sleeve portion was 4.5 millimeters. The internal diameter of the sleeve portion was 20.5 millimeters, and its wall thickness 1.25 millimeters. Molybdenum sulfide lubricant was used in all drawing steps.

The apparatus shown in FIG. 8 was then employed for providing serrations of the type shown in FIG. 4 on the cylindrical sleeve portion. The depth of the grooves in the inner face of the sleeve was 1.25 millimeters. Prior to serrating, the sheet metal structure was subjected to a stress relieving heat treatment. A hardening heat treatment was unnecessary.

FIGS. 1 and 2 respectively illustrate a conventional friction clutch disc and a clutch disc of the invention having the same load capacity. It is evident that the cost of material for the lighter clutch disc hub of the invention is smaller than that for the conventional forged hub. The drawing and serrating operations may be performed at ambient temperature with a stress relieving annealing treatment prior to serrating. Drawing and serrating are less costly than forging and machining. Integral flange portion 48 is conveniently produced in the drawing step in a width not practical in a flanged forging. Only a single row of rivets is thus needed for attaching the friction facings in the clutch disc assembly of the invention as compared to two rows 22, 26 in the conventional disc.

The normal smooth finish of the sheet metal starting blank is maintained in the shaping operations of this invention. A separate finishing step is unnecessary. The small mass of the sheet metal hub does not significantly increase the torque to be supplied by a synchronization mechanism in a connected transmission for accelerating rotation of the main drive pinion.

It should be understood, of course, that the foregoing disclosure related only to preferred embodiments of the invention, and that it is intended to cover all changes and modifications of the examples of the invention herein chosen for the purpose of the disclosure which do not constitute departures from the spirit and scope of the invention set forth in the appended claim.

What is claimed is:

A clutch disc assembly comprising, in combination:
(a) a tubular sleeve portion having an axis,
  (1) said sleeve portion having an inner face and an outer face about said axis,
  (2) said faces being formed with circumferentially alternating axially elongated grooves and ribs,
  (3) the grooves of each face being radially aligned with the ribs of the other face;
(b) a flange portion fixedly fastened to said sleeve portion and extending therefrom in a radially outward direction; and
(c) friction facing means on said flange portion,
  (1) said sleeve portion and said flange portion jointly constituting a unitary sheet metal structure of substantially uniform thickness.

References Cited by the Examiner

UNITED STATES PATENTS

| | | | |
|---|---|---|---|
| 860,590 | 7/1907 | Williams | 192—69 |
| 1,479,974 | 1/1924 | Sturt et al. | 192—107 |
| 1,493,237 | 5/1924 | Birkigt | 192—107 |
| 1,515,284 | 11/1924 | Stahl | 192—107 |
| 2,916,123 | 12/1959 | Garmanger | 192—107 |
| 2,927,674 | 3/1960 | Everitt | 192—107 |
| 3,058,204 | 10/1962 | Jorgensen | 29—159 |
| 3,080,644 | 3/1963 | Prerite et al. | 29—159 |

DAVID J. WILLIAMOWSKY, *Primary Examiner.*

DON A. WAITE, *Examiner.*

B. W. WYCHE, *Assistant Examiner.*